US006495976B2

(12) United States Patent
Higuchi

(10) Patent No.: US 6,495,976 B2
(45) Date of Patent: Dec. 17, 2002

(54) COLOR PURITY MEASURING METHOD AND COLOR PURITY MEASURING APPARATUS

(75) Inventor: Tadashi Higuchi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/917,680

(22) Filed: Jul. 31, 2001

(65) Prior Publication Data

US 2002/0074945 A1 Jun. 20, 2002

(30) Foreign Application Priority Data

Aug. 1, 2000 (JP) ....................................... 2000-233336

(51) Int. Cl.$^{7}$ ........................... G09G 1/28; H01J 29/70; H04N 17/04

(52) U.S. Cl. ..................... 315/368.11; 315/358; 358/10

(58) Field of Search ........................... 315/368.11, 368, 315/364, 308.11, 368.28, 381, 382, 370; 313/316.1, 421, 446, 409, 412

(56) References Cited

U.S. PATENT DOCUMENTS 3,950,671 A * 4/1976 Ichigaya et al. ....... 315/368.11
4,201,932 A * 5/1980 Smith .................... 315/368.27
4,251,832 A * 2/1981 Isono ......................... 348/813
4,688,079 A * 8/1987 Fendley ...................... 348/190
5,754,007 A * 5/1998 Yoshida et al. ................ 315/8
6,060,824 A * 5/2000 Okamoto et al. ........... 313/430
6,239,560 B1 * 5/2001 Kang et al. ................. 315/364

* cited by examiner

*Primary Examiner*—Don Wong
*Assistant Examiner*—Chuc Tran
(74) *Attorney, Agent, or Firm*—Rader, Fishman & Grauer PLLC; Ronald P. Kananen

(57) ABSTRACT

The invention is intended to enable the easy measurement of the amount of color purity at each of many measured points. An adjusting coil (9) is provided at a neck portion of a color cathode ray tube (1). Also, a color image pickup means (4) for photographing the screen of the color cathode ray tube (1) is provided. A monochrome signal of any one of red, green, and blue colors is input to this color cathode ray tube (1). Thereafter, while varying the electric current made to flow through the adjusting coil (9), the image pickup signal obtained by the color pickup means (4) is decomposed into red, green, and blue color signal components; and the intensity of each of them is measured. Then, using the values of the electric currents that are supplied to the coil adjusting (9) and the location distances between the luminous regions of the red, green, and blue colors on the color cathode ray tube (1), there is determined the following: the amount of movement of the relevant electron beam with respect to the unit value of electric current for the adjusting coil (9). Thereby, it is arranged that the amount of color purity at the measured point is obtained according to the amount of movement of the relevant electron beam with respect to the unit value of electric current for the adjusting coil (9).

7 Claims, 4 Drawing Sheets

COLOR PURITY MEASURING METHOD AND COLOR PURITY MEASURING APPARATUS

BACKGROUND OF THE INVENTION

1. Field of the Invention

The present invention relates to a color-purity measuring method for a color cathode ray tube, and a color-purity measuring apparatus.

2. Description of the Prior Art

In general, electron beams corresponding to each of red, green, and blue colors are emitted from an electron gun toward a screen of a color cathode ray tube for causing an image to appear on the screen. Respective optical axes are passed through an aperture grill. It is thereby arranged that the respective electron beams provided on the screen are incident upon red, green, and blue phosphor stripes (or dots) corresponding to these electron beams.

Conventionally, for measuring whether the electron beams corresponding to the red, green, and blue phosphor stripes (or dots), corresponding to these electron beams, provided on the screen are each being correctly incident upon it, the following measures are taken. Namely, an adjusting coil that vertically or horizontally applies a magnetic field to the color cathode ray tube is mounted to a neck portion of the color cathode ray tube. The amount of electric current passed through the adjusting coil and the movement distance of the electron beam, varying depending upon the magnetic field generated due thereto, are visually measured using a microscope.

However, conventionally, since the movement distance of the electron beam in a unit of micron was visually measured, this became a large factor in causing the generation of measurement errors.

Also, there was the inconvenience that a very much greater length of time was needed for measurement as the measured points increased. For example, in a color cathode ray tube, there is a method wherein the color purity at each of 117 points in all of vertical 9 points×horizontal 13 points of the screen is corrected based on the measurement data. It is thereby intended to improve the color purity. However, in this case, only a center point alone was measured, and, regarding each of the other points, the value of the relevant color purity was corrected by substituting data corresponding to the center point.

In that case, the amount of movement of the electron beam that originally differs between a zone including the center and its neighborhood and a zone including a corner and its neighborhood was corrected using the same values. For this reason, there was the inconvenience that such correction was unable to become an excellent correction of the color purity.

SUMMARY OF THE INVENTION

The present invention has been made in view of the above-described problematical points and has an object to enable easy measurement of the amount of color purity at each of many measured points.

A color-purity measuring method according to an example of the present invention is arranged as follows. An adjusting coil is provided at a neck portion of a color cathode ray tube, and there is provided a color image pickup means for photographing the screen of the color cathode ray tube. And, there is provided input means for inputting to the color cathode ray tube a monochrome signal of any one of red, green, and blue color signals. An image pickup signal obtained from the color image pickup means is decomposed into red, green, and blue color signal components while causing an electric current made to flow through the adjusting coil to vary thereby to measure the luminance of each of them. Then, the electric-current value difference between a first electric current value made to flow through the adjusting coil at which the intensity of any one of the red, green, and blue color signal components becomes maximum and a second electric current value made to flow through the adjusting coil at which the intensity of another one of the red, green, and blue color signal components becomes maximum is determined. The amount of movement of an electron beam with respect to a unit value of electric current for the adjusting coil according to the electric current value difference and the location distance between light-emitting regions of the red, green, and blue colors on the color cathode ray tube is determined. Thereby, the amount of color-purity at a relevant measured point is determined according to the amount of movement of an electron beam with respect to a unit value of electric current for the adjusting coil and the value of the electric current corresponding to the intensity peak of the monochrome signal of any said one color signal.

Also, a color-purity measuring apparatus according to an example of the present invention is arranged as follows. It includes an adjusting coil that is mounted at a neck portion of a color cathode ray tube, color image pickup means that photographs a screen of the color cathode ray tube, input means that inputs a monochrome signal of any one of red, green, and blue color signals to the color cathode ray tube, memory means that decomposes a color video signal obtained at the color image pickup means into red, green, and blue color signals and stores these signals therein, variable current supply means that supplies a variable electric current to the adjusting coil, and calculation means that determines an electric-current value difference between a first electric current value made to flow through the adjusting coil at which the intensity of any one of the red, green, and blue color signal obtained in the memory means becomes maximum and a second electric current value made to flow through the adjusting coil at which the intensity of another one of the red, green, and blue color signals becomes maximum, an amount of movement of an electron beam with respect to a unit value of electric current for the adjusting coil according to the electric current value difference and the location distance between light-emitting regions of the red, green, and blue colors on the color cathode ray tube and an amount of color-purity at a relevant measured point according to the amount of movement of an electron beam with respect to a unit value of electric current for the adjusting coil.

According to the above-described present invention, when determining an amount of color purity of, for example, a green color at each of the respective measured points on a color cathode ray tube, a green color signal is input to the color cathode ray tube. Thereby, the screen is set to a green-monochromatic raster one, and this screen is photographed by the color image pickup means. At this time, with respect to this color cathode ray tube, the adjusting coil is mounted at the neck portion of the tube so as to apply a magnetic field, for example, vertically to it. A variable electric current is made to flow through that adjusting coil. Then, the electric-current value difference between a first electric current value made to flow through the adjusting coil at which the intensity of any one of the red, green, and blue color signals at the relevant measured point becomes maximum and a second electric current value made to flow through the adjusting coil at which the intensity of another one of the red, green, and blue color signals becomes maximum is determined. Thereby, the amount of movement of an electron beam with respect to a unit value of electric current for the adjusting coil according to the electric current value difference and the location distance between light-emitting regions of the red, green, and blue colors on the color cathode ray tube is determined. Then, the electric current value made to flow through the adjusting coil at which the intensity value of the green color at each of the respective measured points becomes maximum is determined. This electric current value is multiplied by the amount of movement of the electron beam with respect to that unit value of electric current. By doing so, it is possible to determine the amount of color purity at each of the measured points.

According to the present invention, similarly, it is possible with respect to every point of the screen of the color cathode ray tube photographed by the color image pickup means, to easily measure the amount of color purity of each of the red, green, and blue colors.

DETAILED DESCRIPTION OF THE PREFERRED EMBODIMENTS

An explanation will now be given of a color-purity measuring method and a color-purity measuring apparatus according to an embodiment of the present invention.

Figure 1:
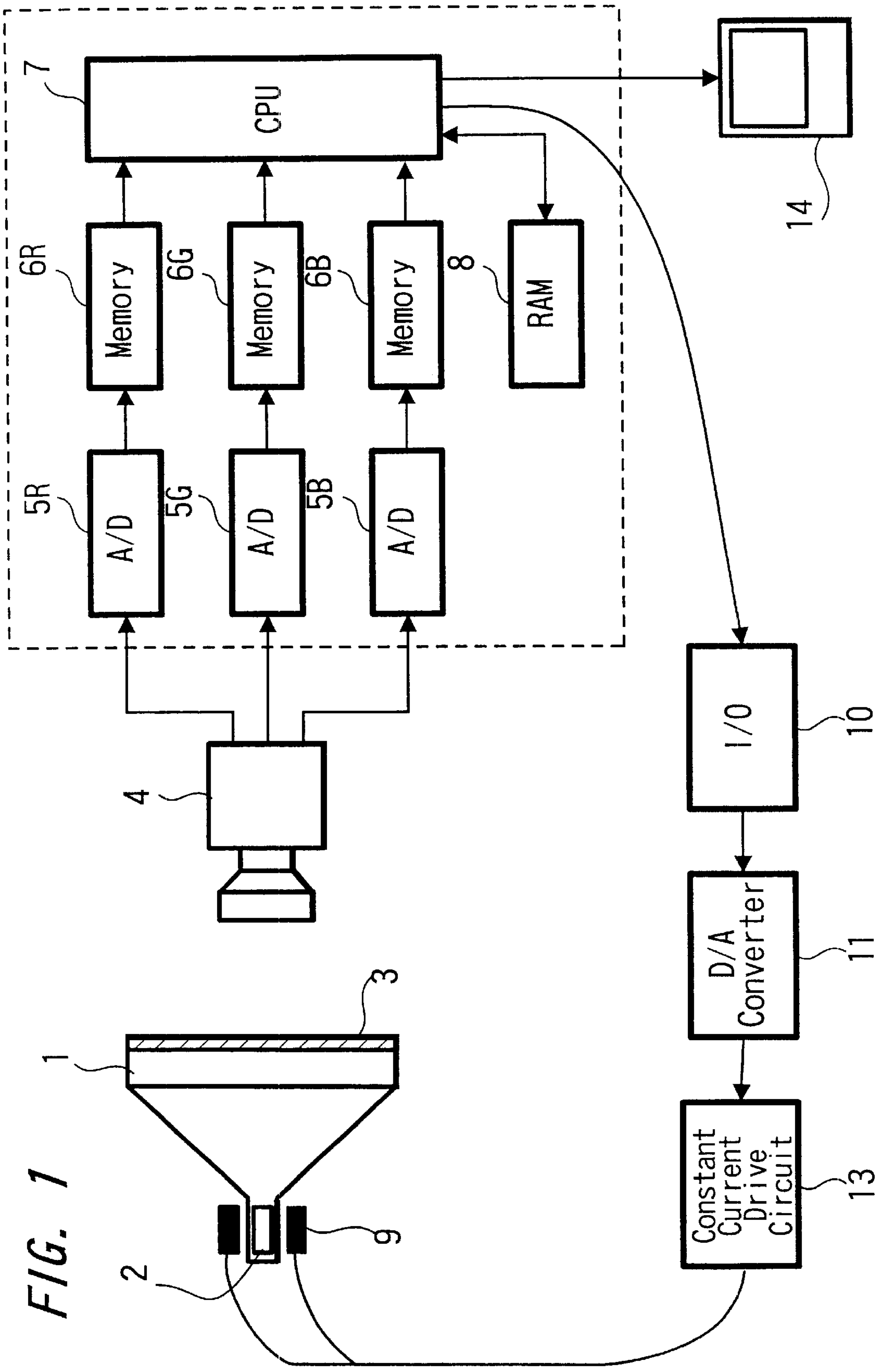
FIG. 1 is a block diagram illustrating an embodiment of a color-purity measuring apparatus according to the present invention.

In FIG. 1, reference numeral 1 denotes a color cathode ray tube by the use of which the amount of color purity is to be measured. This color cathode ray tube 1 is the one wherein, for example, an electron gun 2 is arranged in an in-line fashion and a phosphor surface 3 is arranged in the way that stripe-like pieces of phosphor PS are sequentially disposed with a carbon stramp CS in between. It is arranged that a monochrome signal of one of red, green, and blue color signals is input to this color cathode ray tube 1.

Reference numeral 4 denotes a CCD color image pickup device that has been disposed so as to photograph a screen that is the phosphor surface 3 of the color cathode ray tube 1. A color video signal obtained at the CCD color image pickup device 4 is separated into red, green, and blue color signals. The red, green, and blue color signals are supplied respectively to red, green, and blue memories 6R, 6G, and 6B via A/D converter circuits 5R, 5G, and 5B for converting analog signals to digital signals. These color signals are stored therein.

The color signals that have been stored in these red, green, and blue memories 6R, 6G, and 6B are supplied to a central processing unit (CPU) 7 comprised of a microcomputer and constituting operation means. This central processing unit 7 is fitted with a RAM 8 so that prescribed operations, etc. may be performed.

Also, in this embodiment, at the neck portion of the color cathode ray tube 1, there is mounted a wobbling adjusting coil 9 that generates a magnetic field vertically with respect to the color cathode ray tube 1. It is thereby arranged that a variable electric current is supplied to the adjusting coil 9. In this embodiment, a variable electric current instruction signal from the central processing unit 7 is supplied to a constant current drive circuit 13 via an I/O circuit 10 and a D/A converter circuit 11. It is thereby arranged that a variable electric current that corresponds to an output value of a D/A converter circuit 11 obtained on an output side of this constant current drive circuit 13 is made to flow through the adjusting coil 9.

It is arranged that information obtained at the central processing unit 7 is displayed on a monitor 14 as the necessity arises.

When, in this embodiment, determining the amount of color purity of, for example, a green color, at each of the respective measured points of the color cathode ray tube, the following measures are taken. Namely, a green-monochromatic signal is input to the color cathode ray tube 1 thereby to set a green-monochromatic raster screen. The relevant measures thereby are taken so as to photograph this screen by means of the CCD color image pickup device 4.

Also, in this embodiment, as illustrated in FIG. 1, the adjusting coil 9 applying a magnetic field in the vertical direction with respect to the cathode ray tube is mounted at the neck portion of the tube 1. A variable electric current is made to flow through this adjusting coil 9 so as to generate a variable magnetic field therefrom.

Figure 2:
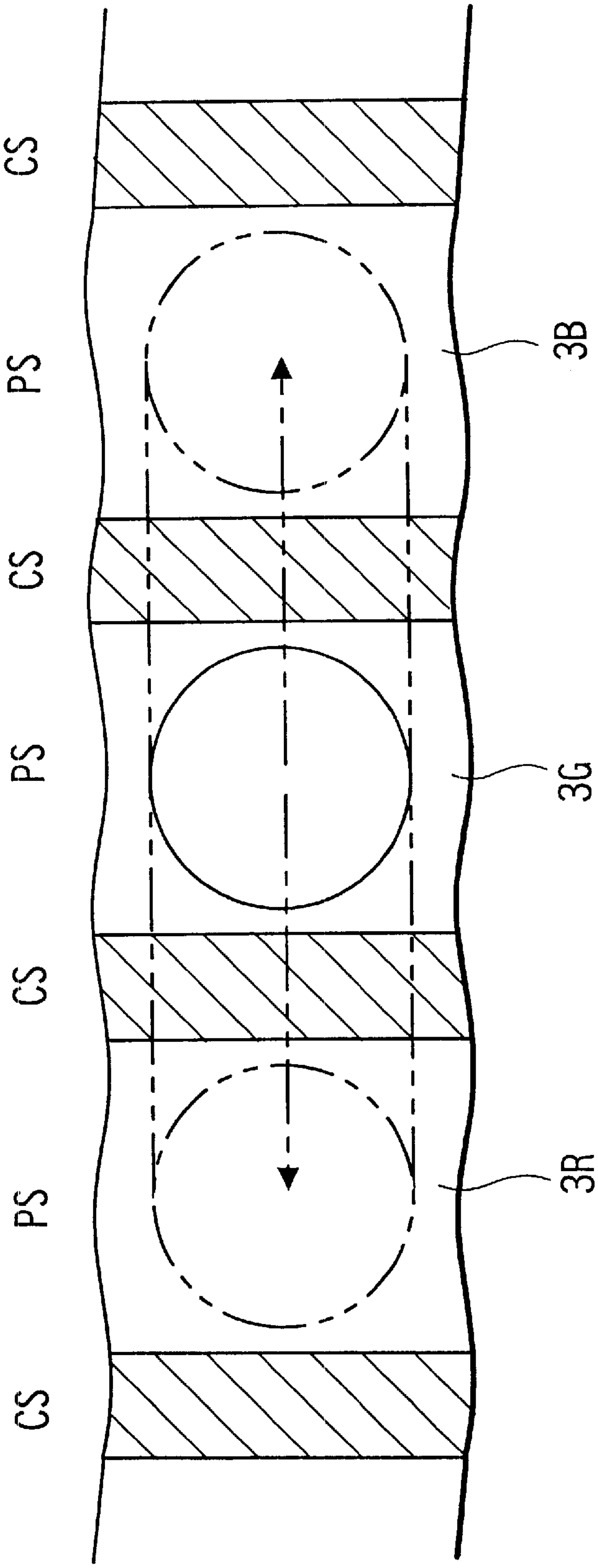
FIG. 2 is a linear diagram illustrating the present invention.

The electric current made to flow through the adjusting coil 9 is made to flow so as to gradually flow from "0" in the (+) direction. Resultantly, the green electron beam makes a horizontal movement toward a blue electron beam. Therefore, in the phosphor surface 3, as illustrated in FIG. 2, the green electron beam that has theretofore impinged upon the green phosphor 3G starts to impinge upon a blue phosphor 3B. The green electron beam moves further, with the result that the screen of the color cathode ray tube 1 becomes a blue-colored raster screen. When the intensity of this blue-colored raster screen declines, the electric current that is supplied to the adjusting coil 9 is stopped.

Figure 3A:
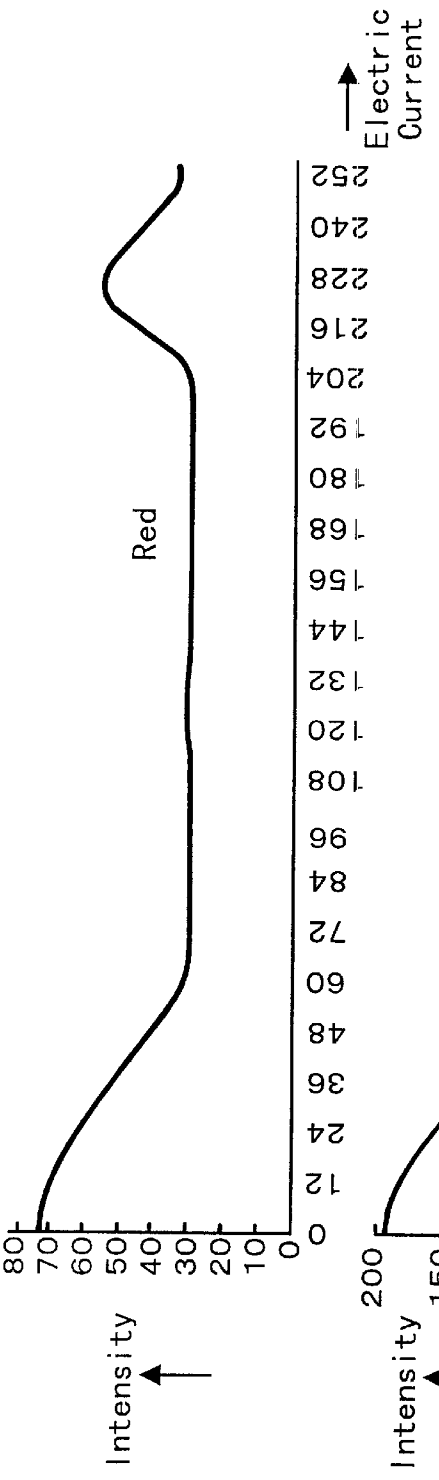
FIG. 3, consisting of FIGS. 3A to 3C, is a linear diagram illustrating the present invention.
Figure 3B:
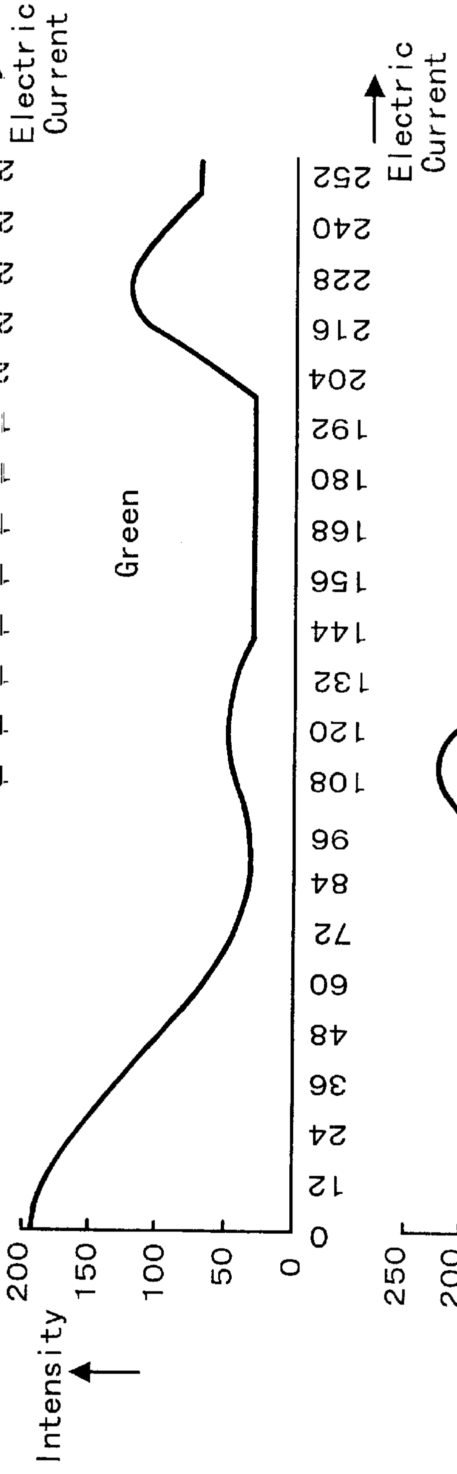
Figure 3C:
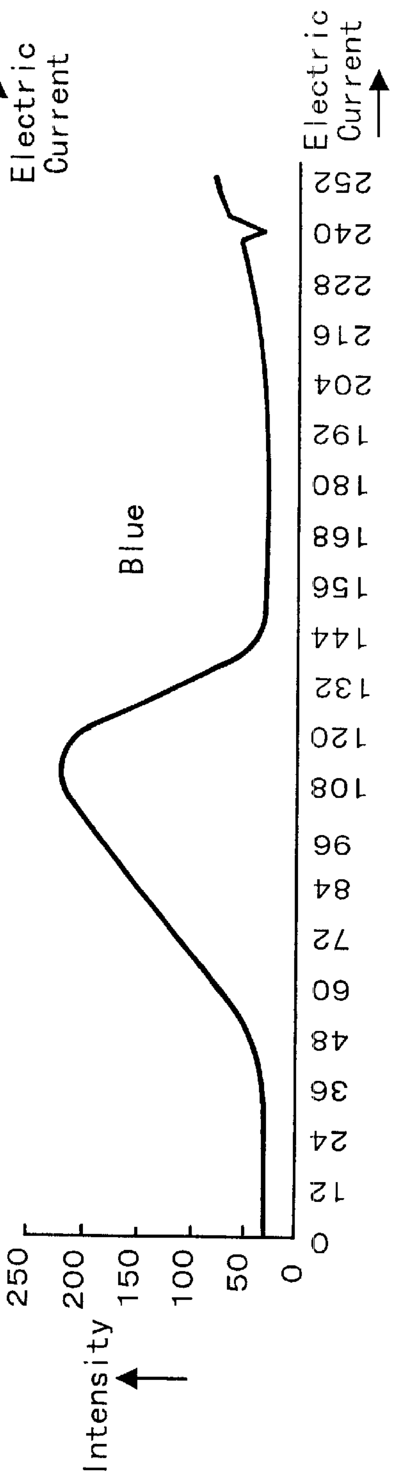

The relationship between the intensity levels obtained in the meantime in the red, green, and blue memories 6R, 6G, and 6B and the electric current supplied to the adjusting coil 9 is as illustrated in FIGS. 3A, 3B, and 3C. In FIGS. 3A, 3B, and 3C, the intensity levels on the ordinate axes represent the A/D values of the A/D converter circuits 5R, 5G, and 5B. The electric current values on the abscissa axes represent the output values of the D/A converter circuit 11. The information such as that illustrated in FIG. 3 at every point on the screen can be recognized by the central processing unit 7.

Next, the electric current made to flow through the adjusting coil 9 is made to flow so as to gradually flow from "0" in the (−) direction. Resultantly, the green electron beam makes a horizontal movement toward a red electron beam. Therefore, in the phosphor surface 3, the green electron beam that has theretofore impinged upon the green phosphor 3G starts to impinge upon a red phosphor 3R. The green electron beam moves further, with the result that the screen of the color cathode ray tube 1 becomes a red-colored raster screen. When the intensity of this red-colored raster screen declines, the electric current that is supplied to the adjusting coil 9 is stopped.

As a result of this, according to the signals stored in the red, green, and blue memories 6R, 6G, and 6B, the central processing unit 7 causes the following electric current values to be stored into the working RAM 8 for each of the measured points at, for example, 117 points in all of vertical 9 points and horizontal 13 points. Namely, the electric current value at which the green color intensity peak is obtained, the electric current value at which the blue color intensity peak is obtained, and the electric current value at which the red color intensity peak is obtained are stored into the working RAM 8, respectively.

Also, the horizontal-pitch length of the phosphor stripes of this color cathode ray tube 1 is already known. Assuming that X1 represents the horizontal-pitch length, the length P1 covering from the center position of the blue phosphor 3B to the center position of the red phosphor 3R is expressed as follows:

$$P1 = X1 \times \tfrac{2}{3}$$

Assuming that "B1" represents the D-A value of D-A converter circuit 11 of the electric current value at which the blue color intensity peak is obtained, and assuming that "R1" represents the D-A value of D-A converter circuit 11 of the electric current value at which the red color intensity peak is obtained, the following formula applies:

$$P1/(B1+R1)$$

This formula represents the amount of movement of the green electron beam per (D-A) value of the D/A converter circuit 11 that is a unit value of electric current.

Accordingly, the amount of movement P1/(B1+R1), per unit value of electric current, of the green electron beam is multiplied by the electric current value that is stored in the working RAM 8 and green intensity peak is obtained. As a result of this, it is possible to measure the amount of color purity of the green color at each of the measured points. As a result of this, it is possible to easily obtain the amounts of color purity of the green color at, for example, the 117 measured points.

In this embodiment, the amount of color purity of each of red and blue colors can be determined with regard to each of the measured points of the color cathode ray tube 1 in the above-described way.

The amounts of color purity at, for example, the vertical 9 and horizontal 13 points, which have been measured as above with regard to the color cathode ray tube 1, can be stored as a table into a memory. If, using this table, it has been arranged that the color purity of the color cathode ray tube 1 is corrected, it becomes possible to obtain a color image of an excellent color purity and excellent quality.

In the above-described embodiment, there is described an example wherein the invention has been applied to the cathode ray tube having the electron guns arranged in line and having the red, green, and blue phosphors formed and arranged in the fashion of stripes. However, the invention can also be applied to a color cathode ray tube having the electron guns arranged in delta and having the red, green, and blue phosphors formed and arranged in the fashion of dots.

Figure 4:
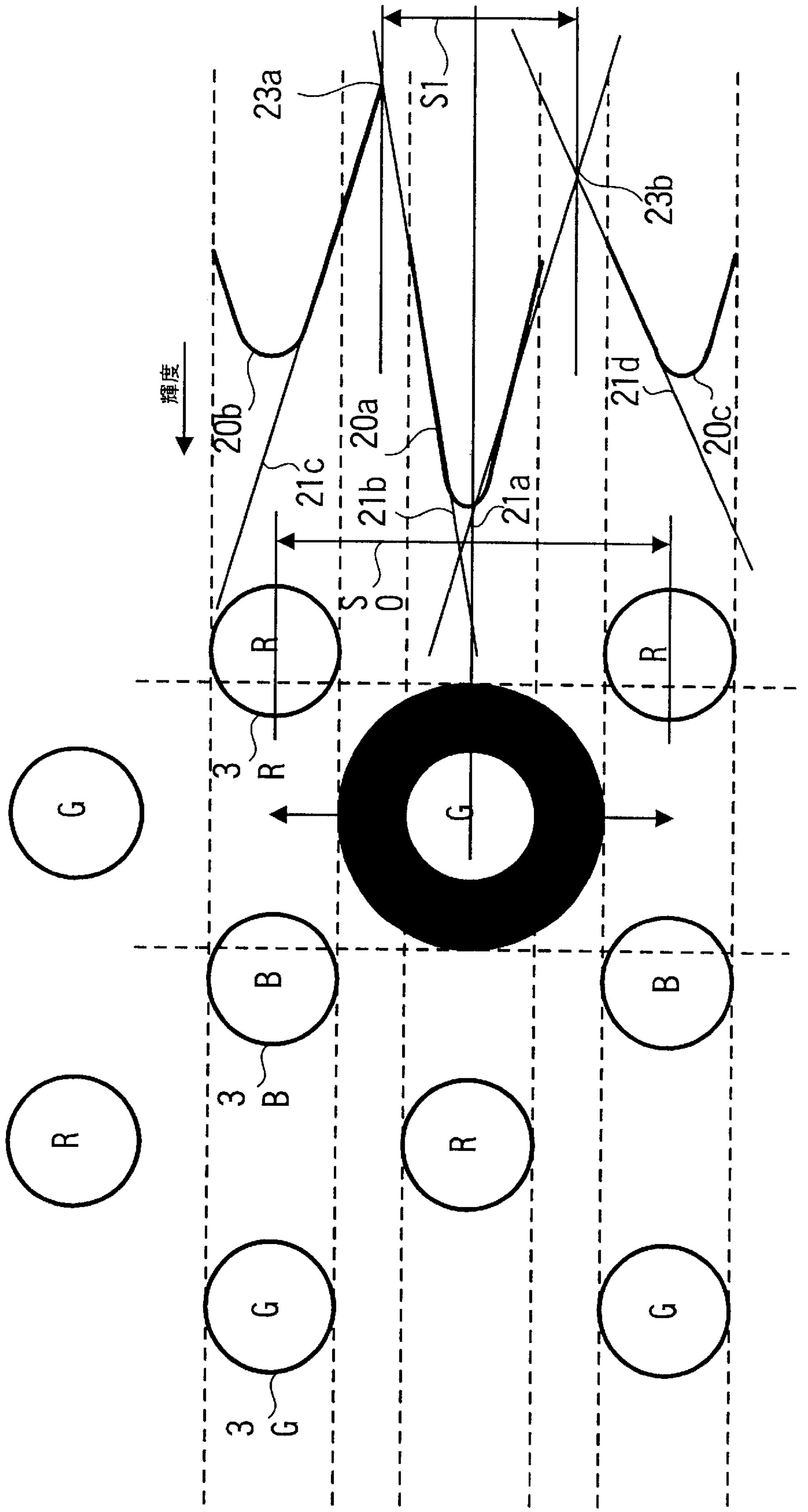
FIG. 4 is a linear diagram illustrating the present invention.

In the color cathode ray tube having the electron guns arranged in delta and having the red, green, and blue phosphors formed and arranged in the fashion of dots, the dispositions of the red, green, and blue phosphors 3R, 3G, and 3B of the tube surface thereof are in the fashion of delta as illustrated in FIG. 4. However, in this tube, when those dispositions are seen only horizontally, the dot-like red, green, and blue phosphors 3R, 3G, and 3B are sequentially arranged horizontally in this order. Therefore, regarding the measurement of the horizontal amount of color purity of the dot-like-phosphor color cathode ray tube, it can be performed in the same way as in the case of the color cathode ray tube having the red, green, and blue phosphors 3R, 3G, and 3B formed and arranged in the fashion of stripes.

In this dot-like-phosphor color cathode ray tube, however, it is further needed to measure the vertical amount of color purity. In order to measure the vertical amount of color purity of this color cathode ray tube, in the color purity a measuring apparatus, such as that illustrated in FIG. 1, and the following measures are taken. Namely, to the neck portion of the color cathode ray tube there is mounted the adjusting coil for applying a horizontal magnetic field to this tube, whereby it is arranged that a variable current is supplied to the adjusting coil.

In this example, in order to determine the vertical amount of color purity, with regard to, for example, the green color, at each of the respective measured points of this color cathode ray tube, the following measures are taken. Namely, to this color cathode ray tube there is input a green-monochromatic signal thereby to make the screen thereof a green-monochromatic raster screen. Simultaneously, this screen is photographed using the CCD color image pickup device 4.

Also, in this example, the adjusting coil is disposed with respect to the color cathode ray tube so as to apply a magnetic field horizontally, whereby a variable electric current is made to flow through the coil. Thereby, arranged that a variable magnetic field is generated.

The electric current made to flow through the adjusting coil is made to flow so as to gradually flow from "0" in the (+) direction. Resultantly, the green electron beam makes a vertical movement upwardly, as illustrated in FIG. 4. Therefore, in the phosphor surface 3, the green electron beam that has theretofore impinged upon the green phosphor 3G starts to impinge upon a blue phosphor 3B or a red phosphor 3R. Thereafter, the electric current that is supplied to that adjusting coil is stopped. Next, the electric current is made to flow through this coil so as to gradually flow from "0" in the (−) direction. Resultantly, the green electron beam, as illustrated in FIG. 4, makes a vertical movement downwardly. Therefore, in the phosphor surface 3, the green electron beam that was here tofore impinged upon the green phosphor 3G starts to impinge upon a blue or red phosphor 3B or 3R. The electric current that is supplied to this adjusting coil is stopped.

In this case, when this green electron beam has impinged upon the red, green, and blue phosphors 3R, 3G, and 3B, the changes in intensity are as indicated in curves 20*a*, 20*b*, and 20*c* illustrated on the right side of FIG. 4. In this example, according to the signals stored in the red, green, and blue memories 6R, 6G, and 6B, the central processing apparatus 7 makes the following determination of the illustrated intersections 23*a* and 23*b*, namely, the intersection 23*a* between the right-side tangential line 21*b* of the green color purity curve 20*a*, taken for each measured point, at each point of vertical 9×horizontal 13 points for example, of the screen and a tangential line 21*c* of a intensity curve 20*b* obtained when having upwardly moved the green electron beam, and the intersection 23*b* between the left-side tangential line 21*a* of that curve 20*a* and a tangential line 21*d* of a intensity curve 20*c* obtained when having downwardly moved that green electron beam.

The vertical distance S1 between these intersections 23*a* and 23*b* is ½ of the vertical known pitch S0 of the dot-like phosphors. Assuming that "B2" and "R2" represent the (D-A) values obtained by passing the electric current values corresponding to the positions of the intersections 23$a$ and 23$b$ through the D/A converter circuit 11, $$S1/(B2+R2)$$

represents the following: the amount of movement of the green electron beam per (D-A) value of the D/A converter circuit 11 that is a unit value of electric current value.

Accordingly, the amount of movement S1/(B2+R2) per unit value of electric current of this green electron beam is multiplied by an electric current value at which the intensity peak of the green color is obtained. As a result of this, it is possible to measure the vertical amount of color purity of the green color at each of the respective measured points.

As a result of this, it is possible to obtain easily the vertical amounts of color purity of the green color at, for example, the 117 measured points.

In this second embodiment, it is possible to determine the vertical amount of color purity of the red and blue colors as well, at each of the respective measured points in the same way as described above.

In the dot-like-phosphor color cathode ray tube, the horizontal and vertical amounts of color purity, at each of, for example, the vertical 9 and horizontal 13 points are measured in the above-described way. These amounts of color purity are stored in the memory as a table. If, using that table, it has been arranged that the color purity of this color cathode ray tube is corrected, it is possible to obtain a color image of an excellent color purity and excellent quality.

Incidentally, the present invention is not limited to the above-described embodiments and of course permits various constructions to be adopted without departing from the subject matter of the invention.

According to the present invention, there are used three factors that follow: the intensity of the red, green, and blue color signals obtained using the color image pickup means: the values of the electric currents made to flow the adjusting coils: and the location distance between the luminous regions of the red, green, and blue colors on the color cathode ray tube. Using these factors, the amount of movement of the electron beam with respect to the unit value of electric current for the adjusting coils is determined. Thereby, it has been arranged that the amount of color purity at the measured point is obtained according to the amount of movement of the electron beam with respect to the unit value of electric current for the adjusting coils. Therefore, it is possible to obtain easily the amount of color purity at many measured points of the screen of the color cathode ray tube.

Having described preferred embodiments of the invention with reference to the accompanying drawings, it is to be understood that the invention is not limited to those precise embodiments and various changes and modifications could be effected therein by one skilled in the art without departing from the spirit or scope of the invention as defined in the appended claims.

What is claimed is:

1. A color-purity measuring method comprising the steps of:

providing an adjusting coil at a neck portion of a color cathode ray tube and providing color image pickup means for photographing the screen of the color cathode ray tube;

inputting a monochrome signal of any one of red, green, and blue colors into the color cathode ray tube;

thereafter decomposing an image pickup signal obtained from the color image pickup means into red, green, and blue color signal components while causing an electric current made to flow through the adjusting coil to vary to thereby measure the intensity of each of them;

thereby determining an amount of movement of an electron beam with respect to a unit value of electric current for the adjusting coil according to the value of the electric current supplied to the adjusting coil and the location distance between luminous regions of the red, green, and blue colors on the color cathode ray tube; and thereby obtaining an amount of color-purity at a relevant measured point according to the amount of movement of an electron beam with respect to a unit value of electric current for the adjusting coil and the value of an electric current corresponding to the intensity peak of the monochrome signal.

2. A color-purity measuring method comprising the steps of:

providing an adjusting coil at a neck portion of a color cathode ray tube and providing color image pickup means for photographing the screen of the color cathode ray tube;

inputting a monochrome signal of any one of red, green, and blue colors into the color cathode ray tube;

decomposing an image pickup signal obtained from the color image pickup means into red, green, and blue color signal components while causing an electric current made to flow through the adjusting coil to vary to thereby measure the intensity of each of them;

determining an electric-current value difference between a first electric current value made to flow through the adjusting coil at which the intensity of any one of the red, green, and blue color signal components becomes maximum and a second electric current value made to flow through the adjusting coil at which the intensity of another one of the red, green, and blue color signal components becomes maximum;

determining the amount of movement of an electron beam with respect to a unit value of electric current for the adjusting coil according to the electric current value difference and the location distance between luminous regions of the red, green, and blue colors on the color cathode ray tube; and thereby obtaining an amount of color-purity at a relevant measured point according to the amount of movement of an electron beam with respect to a unit value of electric current for the adjusting coil.

3. The color-purity measuring method according to claim 2, wherein when measuring the amount of color purity of the green color, the green color signal is input into the color cathode ray tube to thereby obtain the electric current value for the adjusting coil at which the intensity of each of the red and blue color signal components becomes maximum.

4. The color-purity measuring method according to claim 1, wherein the adjusting coil is made to generate a magnetic field vertically with respect to the color cathode ray tube.

5. The color-purity measuring method according to claim 1, wherein the adjusting coil is made to generate a magnetic field horizontally with respect to the color cathode ray tube.

6. A color-purity measuring apparatus comprising:

an adjusting coil that is mounted at a neck portion of a color cathode ray tube;

color image pickup means that photographs a screen of the color cathode ray tube;

input means that inputs a monochrome signal of any one of red, green, and blue color signals to the color cathode ray tube;

memory means that decomposes a color video signal obtained in the color image pickup means into red, green, and blue color signals and stores these signals therein;

variable current supply means that supplies a variable electric current to the adjusting coil; and calculation means that according to the intensity of each of red, green, and blue color signals obtained in the memory means, an electric current value made to flow through the adjusting coil, and the location distance between luminous regions of red, green, and blue colors on the cathode ray tube determines an amount of movement of an electron beam with respect to a unit value of electric current for the adjusting coil and, according to the amount of movement of an electron beam with respect to a unit value of electric current for the adjusting coil determines an amount of color purity at a relevant measured point.

7. The color purity measuring apparatus according to claim 6, wherein the calculation means determines an electric-current value difference between a first electric current value made to flow through the adjusting coil at which the intensity of any one of the red, green, and blue color signals obtained in the memory means becomes maximum and a second electric current value made to flow through the adjusting coil at which the intensity of another one of the red, green, and blue color signals becomes maximum; according to the electric-current value difference and the location distance between luminous regions of the red, green, and blue colors on the color cathode ray tube determines an amount of movement of an electron beam with respect to a unit value of electric current for the adjusting coil according to the electric current value difference; and according to the amount of movement of an electron beam with respect to a unit value of electric current for the adjusting coil determines an amount of color-purity at a relevant measured point.

* * * * *

UNITED STATES PATENT AND TRADEMARK OFFICE

CERTIFICATE OF CORRECTION

PATENT NO. : 6,495,976 B2
DATED : December 17, 2002
INVENTOR(S) : Tadashi Higuchi It is certified that error appears in the above-identified patent and that said Letters Patent is hereby corrected as shown below:

Title page,
Item [57], ABSTRACT,
Line 13, replace “coil adjusting” with -- adjusting coil --.

Signed and Sealed this

Third Day of June, 2003

JAMES E. ROGAN
*Director of the United States Patent and Trademark Office*